United States Patent
Bryan et al.

(10) Patent No.: US 9,088,571 B2
(45) Date of Patent: Jul. 21, 2015

(54) PRIORITY ASSIGNMENTS FOR POLICY ATTACHMENTS

(75) Inventors: Jeffrey Jason Bryan, Mountain House, CA (US); Nickolas Kavantzas, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 13/596,525

(22) Filed: Aug. 28, 2012

(65) Prior Publication Data

US 2013/0086240 A1 Apr. 4, 2013

Related U.S. Application Data

(63) Continuation of application No. 13/436,940, filed on Mar. 31, 2012.

(60) Provisional application No. 61/541,450, filed on Sep. 30, 2011.

(51) Int. Cl.
*H04L 12/24* (2006.01)
*H04L 29/06* (2006.01)

(52) U.S. Cl.
CPC .............. *H04L 63/10* (2013.01); *H04L 41/0246* (2013.01); *H04L 41/0873* (2013.01); *H04L 63/20* (2013.01)

(58) Field of Classification Search
CPC ....... H04L 63/10; H04L 63/20; H04L 63/102; H04L 63/0227; H04L 41/0246; H04L 41/0873; G06F 21/6218; G06F 21/604
USPC .......................................................... 726/1
See application file for complete search history.

(56) References Cited

U.S. PATENT DOCUMENTS

| | | | |
|---|---|---|---|
| 5,797,128 A | 8/1998 | Birnbaum | |
| 5,889,953 A * | 3/1999 | Thebaut et al. | 709/221 |
| 6,064,656 A | 5/2000 | Angal et al. | |
| 6,167,445 A | 12/2000 | Gai et al. | |
| 6,381,639 B1 * | 4/2002 | Thebaut et al. | 709/222 |
| 6,516,416 B2 | 2/2003 | Gregg et al. | |
| 6,578,076 B1 | 6/2003 | Putzolu | |
| 6,944,183 B1 | 9/2005 | Iyer et al. | |
| 6,952,728 B1 | 10/2005 | Alles et al. | |
| 7,213,068 B1 | 5/2007 | Kohli et al. | |

(Continued)

OTHER PUBLICATIONS

Non Final Office Action for U.S. Appl. No. 13/118,940 (Feb. 13, 2013). 9 pages.

(Continued)

*Primary Examiner* — Eleni Shiferaw
*Assistant Examiner* — Nelson Scott Giddins
(74) *Attorney, Agent, or Firm* — Kilpatrick Townsend & Stockton LLP

(57) ABSTRACT

Techniques for resolving conflicts between web service policies that are attached (via LPA and/or GPA metadata) to a policy subject (e.g., a WS client/service endpoint). In one set of embodiments, a priority value can be assigned to each policy attached to a policy subject via the policy's corresponding policy attachment metadata file. These priority values can be taken into account when determining whether one policy should be given precedence over another, conflicting policy attached to the same policy subject. In certain embodiments, as part of this determination, the priority value of a policy can be given greater weight than the scope at which the policy is attached.

20 Claims, 5 Drawing Sheets

(56) References Cited

U.S. PATENT DOCUMENTS

| | | | |
|---|---|---|---|
| 7,290,288 B2 | 10/2007 | Gregg et al. | |
| 7,350,204 B2 | 3/2008 | Lambert et al. | |
| 7,478,419 B2 | 1/2009 | Anderson et al. | |
| 7,607,164 B2* | 10/2009 | Vasishth et al. | 726/1 |
| 7,725,605 B2 | 5/2010 | Palmeri et al. | |
| 7,796,760 B2 | 9/2010 | Brettle et al. | |
| 7,855,972 B2 | 12/2010 | Pettit et al. | |
| 7,877,264 B2 | 1/2011 | Fox et al. | |
| 8,145,784 B2* | 3/2012 | See et al. | 709/232 |
| 8,156,538 B2 | 4/2012 | Kanade et al. | |
| 8,265,969 B2 | 9/2012 | Comstock et al. | |
| 8,307,413 B2 | 11/2012 | Smadja et al. | |
| 8,417,709 B2* | 4/2013 | Chiticariu et al. | 707/743 |
| 8,448,216 B2* | 5/2013 | Liu et al. | 726/1 |
| 8,484,693 B2* | 7/2013 | Cox et al. | 726/1 |
| 8,560,819 B2 | 10/2013 | Fillipi et al. | |
| 8,875,306 B2* | 10/2014 | Lowes | 726/28 |
| 2002/0124067 A1 | 9/2002 | Parupudi et al. | |
| 2002/0143914 A1* | 10/2002 | Cihula | 709/223 |
| 2002/0184525 A1* | 12/2002 | Cheng | 713/201 |
| 2003/0023587 A1* | 1/2003 | Dennis et al. | 707/3 |
| 2003/0115179 A1 | 6/2003 | Prabakaran et al. | |
| 2003/0115484 A1 | 6/2003 | Moriconi et al. | |
| 2003/0229501 A1 | 12/2003 | Copeland et al. | |
| 2004/0039594 A1 | 2/2004 | Narasimhan et al. | |
| 2004/0177139 A1* | 9/2004 | Schuba et al. | 709/223 |
| 2004/0189708 A1 | 9/2004 | Larcheveque et al. | |
| 2005/0038790 A1 | 2/2005 | Wolthusen | |
| 2005/0080914 A1 | 4/2005 | Lerner et al. | |
| 2005/0086197 A1* | 4/2005 | Boubez et al. | 707/1 |
| 2005/0091352 A1 | 4/2005 | Alex et al. | |
| 2005/0223109 A1 | 10/2005 | Mamou et al. | |
| 2006/0041565 A1 | 2/2006 | Cuomo et al. | |
| 2006/0053120 A1 | 3/2006 | Shum et al. | |
| 2006/0075465 A1 | 4/2006 | Ramanathan et al. | |
| 2006/0088276 A1 | 4/2006 | Cho et al. | |
| 2006/0089938 A1* | 4/2006 | Leonard et al. | 707/100 |
| 2006/0117063 A1 | 6/2006 | Havewala et al. | |
| 2006/0206440 A1* | 9/2006 | Anderson et al. | 705/500 |
| 2006/0230430 A1 | 10/2006 | Hondo et al. | |
| 2006/0282876 A1* | 12/2006 | Shelest et al. | 726/1 |
| 2007/0006278 A1 | 1/2007 | Avram et al. | |
| 2007/0157287 A1 | 7/2007 | Lim | |
| 2007/0204324 A1 | 8/2007 | Roberts et al. | |
| 2007/0266032 A1 | 11/2007 | Blumenau | |
| 2007/0266422 A1 | 11/2007 | Germano et al. | |
| 2007/0282879 A1 | 12/2007 | Degenkolb et al. | |
| 2008/0040364 A1* | 2/2008 | Li | 707/100 |
| 2008/0046961 A1 | 2/2008 | Pouliot | |
| 2008/0065466 A1 | 3/2008 | Liu et al. | |
| 2008/0066189 A1* | 3/2008 | Liu et al. | 726/28 |
| 2008/0071805 A1 | 3/2008 | Mourra et al. | |
| 2008/0091682 A1 | 4/2008 | Lim | |
| 2008/0098453 A1 | 4/2008 | Hinton et al. | |
| 2008/0148345 A1 | 6/2008 | Rubio | |
| 2008/0155641 A1* | 6/2008 | Beavin et al. | 726/1 |
| 2008/0184201 A1* | 7/2008 | Burns et al. | 717/121 |
| 2008/0189760 A1 | 8/2008 | Rosenberg et al. | |
| 2008/0225748 A1 | 9/2008 | Khemani et al. | |
| 2008/0229381 A1 | 9/2008 | Sikka et al. | |
| 2008/0244692 A1 | 10/2008 | Chang | |
| 2008/0244693 A1 | 10/2008 | Chang | |
| 2008/0256593 A1* | 10/2008 | Vinberg et al. | 726/1 |
| 2008/0288651 A1 | 11/2008 | Brauel et al. | |
| 2008/0301757 A1 | 12/2008 | Demarest et al. | |
| 2008/0320550 A1* | 12/2008 | Strassner et al. | 726/1 |
| 2009/0049518 A1* | 2/2009 | Roman et al. | 726/1 |
| 2009/0070853 A1 | 3/2009 | Chung et al. | |
| 2009/0099860 A1 | 4/2009 | Karabulut et al. | |
| 2009/0099882 A1 | 4/2009 | Karabulut | |
| 2009/0106816 A1* | 4/2009 | Ito | 726/1 |
| 2009/0125612 A1* | 5/2009 | Rabetge et al. | 709/220 |
| 2009/0150824 A1 | 6/2009 | Furuichi | |
| 2009/0177929 A1 | 7/2009 | Sijelmassi | |
| 2009/0193057 A1 | 7/2009 | Maes | |
| 2009/0205013 A1* | 8/2009 | Lowes | 726/1 |
| 2009/0281996 A1* | 11/2009 | Liu et al. | 707/3 |
| 2010/0030890 A1 | 2/2010 | Dutta et al. | |
| 2010/0064184 A1 | 3/2010 | Almeida et al. | |
| 2010/0077455 A1 | 3/2010 | Nishio et al. | |
| 2010/0100810 A1 | 4/2010 | Nakamura et al. | |
| 2010/0115075 A1* | 5/2010 | Chen et al. | 709/223 |
| 2010/0125477 A1 | 5/2010 | Mousseau et al. | |
| 2010/0125665 A1 | 5/2010 | Simpson et al. | |
| 2010/0153695 A1 | 6/2010 | Bussard et al. | |
| 2010/0175105 A1* | 7/2010 | Vasishth et al. | 726/1 |
| 2010/0217853 A1* | 8/2010 | Alexander et al. | 709/223 |
| 2010/0235915 A1 | 9/2010 | Memon et al. | |
| 2010/0269148 A1* | 10/2010 | Almeida et al. | 726/1 |
| 2010/0281455 A1 | 11/2010 | Anand et al. | |
| 2010/0281516 A1* | 11/2010 | Lerner et al. | 726/1 |
| 2011/0035650 A1 | 2/2011 | Jardine-Skinner et al. | |
| 2011/0047451 A1 | 2/2011 | Jardine-Skinner et al. | |
| 2011/0131275 A1 | 6/2011 | Maida-Smith et al. | |
| 2011/0302239 A1 | 12/2011 | Grateau et al. | |
| 2011/0321122 A1* | 12/2011 | Mwangi et al. | 726/1 |
| 2012/0054163 A1* | 3/2012 | Liu et al. | 707/694 |
| 2012/0093031 A1* | 4/2012 | Wang et al. | 370/254 |
| 2012/0102182 A1* | 4/2012 | Voskuil et al. | 709/223 |
| 2012/0110093 A1 | 5/2012 | Tingstrom et al. | |
| 2012/0131134 A1* | 5/2012 | De Foy et al. | 709/217 |
| 2012/0131164 A1* | 5/2012 | Bryan et al. | 709/223 |
| 2012/0216100 A1 | 8/2012 | Jardine-Skinner et al. | |
| 2012/0311658 A1* | 12/2012 | Dozier | 726/1 |
| 2013/0262646 A1 | 10/2013 | Fiebig et al. | |
| 2013/0347062 A1* | 12/2013 | Matityahu et al. | 726/1 |
| 2014/0096188 A1* | 4/2014 | Mont et al. | 726/1 |
| 2014/0179271 A1* | 6/2014 | Guccione et al. | 455/410 |

OTHER PUBLICATIONS

Non Final Office Action for U.S. Appl. No. 13/149,049 (Mar. 5, 2013). 14 pages.

Non-Final Office Action for U.S. Appl. No. 14/026,767 (Mar. 4, 2014) 7 pages.

Non-Final Office Action for U.S. Appl. No. 13/596,861 (Apr. 10, 2014) 28 pages.

Non Final Office Action for U.S. Appl. No. 13/149,037 (May 1, 2013), 8 pages.

Non Final Office Action for U.S. Appl. No. 13/118,944 (May 16, 2013), 30 pages.

Shute, et al., "DataPower SOA Appliance Service Planning, Implementation, and Best Practices," IBM Redbook, SG24-7943-00, Jun. 28, 2011.

Nordbotten, N.A., "XML and Web Services Security Standards," Communications Surveys & Tutorials, IEEE, vol. 11, No. 3, pp. 4,21, 3rd Quarter 2009.

Final Office Action for U.S. Appl. No. 13/149,065 (Jul. 3, 2013), 20 pages.

Non Final Office Action for U.S. Appl. No. 13/436,940 (Jul. 15, 2013), 30 pages.

Final Office Action for U.S. Appl. No. 13/118,940 (Aug. 29, 2013) 10 pages.

Notice of Allowance for U.S. Appl. No. 13/149,049 (Sep. 17, 2013) 10 pages.

Notice of Allowance for U.S. Appl. No. 13/149,037 (Oct. 8, 2013) 7 pages.

Non Final Office Action for U.S. Appl. No. 13/149,065 (Dec. 4, 2012).

Bajaj et al. "Web Services Policy Framework (WS-Policy)" Version 1.2, BEA Systems, Inc. (Mar. 2006).

Christensen et al. "Web Services Description Language (WSDL)" version 1.1, World Wide Web Consortium (Mar. 2001).

Phan et al. "Quality-Driven Business Policy Specifications and Refinement for Service-Oriented Systems," Proceedings of the 6th International Conference on Service-Oriented Computing (ICSOC 2008) 5364:5-21 (2008).

Notice of Allowance for U.S. Appl. No. 13/118,940 (Jan. 15, 2014) 5 pages.

Final Office Action for U.S. Appl. No. 13/436,940 (Jan. 28, 2014) 21 pages.

(56) References Cited

OTHER PUBLICATIONS

Non-Final Office Action for U.S. Appl. No. 13/436,933 (Feb. 20, 2014) 24 pages.
Advisory Action for U.S. Appl. No. 13/436,940 (Apr. 22, 2014) 5 pages.
Final Office Action for U.S. Appl. No. 13/436,933 (Aug. 29, 2014), 28 pages.
Final Office Action for U.S. Appl. No. 13/596,891(Oct. 2, 2014), 11 pages.
Final Office Action for U.S. Appl. No. 13/596,861 (Oct. 3, 2014), 30 pages.
Notice of Allowance for U.S. Appl. No. 14/106,037 Oct. 24, 2014), 9 pages.
Notice of Allowance for U.S. Appl. No. 14/026,767 (Sep. 8, 2014) 9 pages.
Non-Final Office Action for U.S. Appl. No. 13/116,947 (Jun. 20, 2014) 31 pages.
Non-Final Office Action for U.S. Appl. No. 13/596,891 (Apr. 25, 2014) 10 pages.
Non-Final Office Action for U.S. Appl. No. 13/149,065 (Jul. 14, 2014) 23 pages.
Non-Final Office Action for U.S. Appl. No. 14/106,037 (Jul. 16, 2014), 16 pages.
Notice of Allowance for U.S. Appl. No. 13/436,940 (Aug. 12, 2014), 13 pages.
Non-Final Office Action for U.S. Appl. No. 13/596,545 (Aug. 4, 2014), 27 pages.
Ion et al., "Extending the Java Virtual Machine to Enforce Fine-Grained Security Policies in Mobile Devices," Dec. 2007, Twenty-Third Annual Computer Security Applications Conference, pp. 233-242.
Notice of Allowance for U.S. Appl. No. 13/596,545 (Nov. 25, 2014) 15 pages.
Notice of Allowance for U.S. Appl. No. 13/149,065 (Dec. 29, 2014) 10 pages.
Montanari et al. "Policy-based Separation of Concerns for Dynamic Code Mobility Management," Proceedings of the 27th Annual International Computer Software and Applications Conference, pp. 82-90 (Nov. 2003).
Final Office Action for U.S. Appl. No. 13/118,947, filed Jan. 15, 2015 32 pages.
Notice of Allowance for U.S. Appl. No. 13/596,891, filed Feb. 2, 2015 5 pages.
Notice of Allowance for U.S. Appl. No. 13/436,933, filed Jan. 21, 2015 21 pages.
Schuba et al., Scaling Network Services Using Programmable Network Devices, Apr. 2005, Computer by IEEE Computer Society, vol. 38, No. 4, pp. 52-60.
Notice of Allowance for U.S. Appl. No. 13/596,861 mailed on Mar. 13, 2015, 22 pages.

* cited by examiner

PRIORITY ASSIGNMENTS FOR POLICY ATTACHMENTS

CROSS-REFERENCES TO RELATED APPLICATIONS

This application is a continuation of U.S. application Ser. No. 13/436,940, filed Mar. 31, 2012, which claims the benefit under 35 U.S.C. 119(e) of U.S. Provisional Application No. 61/541,450, filed Sep. 30, 2011. The entire contents of the 61/541,450 and Ser. No. 13/436,940 applications are incorporated herein by reference for all purposes.

BACKGROUND

Companies worldwide are actively deploying service-oriented architecture (SOA) infrastructures using web services, both in intranet and extranet environments. While web services offer many advantages over traditional alternatives (e.g., distributed objects or custom software), deploying large networks of interconnected web services can still present several challenges, particularly with respect to security and management.

Some existing SOA middleware solutions have addressed these challenges via the implementation of a policy-based security/management model. For example, Oracle Corporation's Oracle Web Services Manager (OWSM) enables companies to centrally define and store declarative policy documents (referred to herein as web service policies or policies) that describe security and/or management-related behaviors for web service clients and services in an SOA infrastructure. Each policy can be attached to one or more web service entities referred to herein as policy subjects (e.g., web service (WS) client/service endpoints hosted by one or more SOA applications). The attached policies can then be enforced at the policy subjects through configurable agents. With this model, security/management logic does not need to be hard-coded into an SOA application. Rather, such logic can be externalized in the form of a declarative web service policy, which can then be attached to a policy subject as needed by modifying metadata (referred to herein as policy attachment metadata) associated with the policy subject.

In certain implementations, policies can be attached to a policy subject via global policy attachment (GPA) metadata and/or via local policy attachment (LPA) metadata. As used herein, GPA metadata refers to one or more files that are stored in a centralized metadata store and that indirectly attach a policy with a set of policy subjects (e.g., WS client/service endpoints) by specifying a scope (e.g., domain, server, application, application port, etc.) to which the policy should apply. The scope levels can be organized in a hierarchy, with "domain" representing the highest scope level and "application port" representing the lowest scope level. The "application port" level can correspond to a specific WS client/service endpoint. This GPA mechanism is typically used by system administrators of an SOA deployment, as it allows them to attach a policy to a multitude of policy subjects in an efficient and consistent manner. Additional information regarding global policy attachments can be found in U.S. patent application Ser. No. 13/118,947, filed May 31, 2011 and entitled "ATTACHING WEB SERVICE POLICIES TO A GROUP OF POLICY SUBJECTS," which is incorporated herein by reference in its entirety for all purposes.

As used herein, LPA metadata refers to one or more files that are stored with an SOA application and that directly attach a policy with a particular WS client/service endpoint of the application. This is logically equivalent to defining a GPA metadata file that attaches a policy to an application port. This LPA mechanism is typically used by SOA application developers, as it allows them to define security/management behaviors for the client/service endpoints of their application at design-time, and to subsequently package those behaviors (in the form of LPA metadata files) with the application.

One shortcoming with existing policy-based SOA solutions that support global and local policy attachment is that they generally apply an inflexible rule set when resolving conflicts between policies that are attached to the same policy subject via different LPA and/or GPA metadata files. This inflexibility can be problematic in several scenarios. For example, existing SOA solutions generally impose a strict rule indicating that two policies of the same type (e.g., two authentication policies) cannot be attached to a single WS client/service endpoint at the same time. Thus, when two identical policies (which necessarily are of the same type) are attached to the same policy subject (via, e.g., duplicate LPA and/or GPA metadata files), an error will always be thrown, thereby causing neither policy attachment to be recognized. This outcome may not be desirable since, in certain cases, the original intent of the individuals that created the policy attachments may have been to ensure that the policy is attached and enforced at the endpoint. The fact that the same policy was attached more than once via duplicate policy attachments may have been, e.g., an oversight or due to a lack of communication between the individuals.

As another example, existing SOA solutions generally impose a strict rule indicating that a policy attachment defined at a lower scope level always takes precedence over a conflicting policy attachment defined at a higher scope level. However, consider a scenario where (1) application developers have attached, via LPA metadata, various authentication policies to specific WS client/service endpoints (i.e., ports) of SOA applications that are deployed in an SOA environment; and (2) a system administrator of the environment wishes to define a global policy attachment that attaches a more secure authentication policy at a higher scope level (e.g., domain), thereby overriding all of the local policy attachments. With the rule described above this is not possible, since a global policy attachment defined at the scope level of "domain" can never override, or be given precedence over, conflicting local policy attachments (which are considered to be at the lowest scope level of "application port").

BRIEF SUMMARY

Embodiments of the present invention provide techniques for resolving conflicts between web service policies that are attached (via LPA and/or GPA metadata) to a policy subject (e.g., a WS client/service endpoint).

In one set of embodiments, a determination can be made whether two conflicting policies that are attached to the same policy subject are identical. This determination can be based on, e.g., the Uniform Resource Identifiers (URIs) that are used to identify the policies in their respective policy attachment metadata files, as well as any policy configuration properties. If the two conflicting policies are determined to be identical, the policy attachment metadata for one of the policy can be considered valid, while the policy attachment metadata for the other, identical policy can be ignored. In this manner, validation errors arising from duplicate policy attachments can be avoided.

In another set of embodiments, a priority value can be assigned to each policy attached to a policy subject via the policy's corresponding policy attachment metadata file. These priority values can be taken into account when determining whether one policy should be given precedence over another, conflicting policy attached to the same policy subject. In certain embodiments, as part of this determination, the priority value of a policy can be given greater weight than the scope at which the policy is attached. For example, assume that policies attached to a policy subject at a lower scope level are typically given precedence over policies attached at a higher scope level. With the techniques described herein, the policy with the highest priority value can be given precedence even if other, conflicting policies are attached at a lower scope level.

According to one set of embodiments of the present invention, a determination can be made whether a first web service policy attached to a policy subject via a first policy attachment metadata file is identical to a second web service policy attached to the policy subject via a second policy attachment metadata file, where attachment of the first web service policy to the policy subject conflicts with attachment of the second web service policy to the policy subject according to one or more predefined rules. If the first web service policy and the second web service policy are determined to be identical, the first web service policy or the second web service policy can be enforced at the policy subject.

In one embodiment, if the first web service policy and the second web service policy are not determined to be identical, neither the first web service policy nor the second web service policy may be enforced at the policy subject.

In one embodiment, the first web service policy can be of a first policy type, and the second web service policy can be of a second policy type that conflicts with the first policy type.

In one embodiment, the first web service policy and the second web service policy can both be authentication policies.

In one embodiment, the policy subject can be a web service endpoint of a Service-Oriented Architecture (SOA) application.

In one embodiment, the first web service policy and the second web service policy can each define one or more security or management-related assertions, and enforcing the first web service policy or the second web service policy at the web service endpoint can comprise enforcing the one or more security or management-related assertions.

In one embodiment, the first policy attachment metadata file can include a first policy reference identifying the first web service policy, and the second policy attachment metadata can include a second policy reference identifying the second web service policy.

In one embodiment, the first and second policy references can be Uniform Resource Identifiers (URIs). In this embodiment, determining whether the first web service policy is identical to the second web service policy can comprise comparing their respective URIs.

In one embodiment, the first policy attachment metadata file can further include first configuration override information usable when enforcing the first web service policy, and the second policy attachment metadata file can further include second configuration override information usable when enforcing the second web service policy. The first configuration override information and the second configuration override information can each comprise a plurality of name-value pairs. In this embodiment, determining whether the first web service policy is identical to the second web service policy can further comprise comparing the first configuration override information to the second configuration override information.

According to another set of embodiments of the present invention, policy attachment information can be retrieved identifying a plurality of web service policies attached to a policy subject, where the policy attachment information includes, for each web service policy, an identifier of the web service policy, a scope at which the web service policy is attached to the policy subject, and a priority value. A determination can be made that a first web service policy in the plurality of web service policies should be given precedence over a second, conflicting web service policy in the plurality of web service policies, the determining being based on the priority values and the scopes of the first and second web service policies. The first web service policy can then be added to an effective policy set of the policy subject, the effective policy set representing policies that will be enforced at the policy subject at runtime of an application hosting the policy subject.

In one embodiment, the policy attachment information can be retrieved from one or more policy attachment metadata files associated with the policy subject.

In one embodiment, the one or more policy attachment metadata files can include a local policy attachment (LPA) metadata file and a global policy attachment (GPA) metadata file.

In one embodiment, the determining can comprise constructing a two-dimensional table based on the policy attachment information, where a first dimension of the table is organized by scope, wherein a second dimension of the table is organized by priority value, and where each cell in the table identifies a web service policy associated with the cell's scope and priority value. The table can then be traversed along the first and second dimensions.

In one embodiment, the first web service policy can have a higher priority value than the second web service policy, while being attached at a higher scope level than the second web service policy.

In one embodiment, the first web service policy can have the same priority value as the second web service policy, and can be attached at a lower scope level than the second web service policy.

In one embodiment, the first and second web service policies can conflict due to having identical policy types. For example, the first and second web service policies can both be authentication policies.

In one embodiment, the second web service policy may not be added to the effective policy set.

In one embodiment, the policy subject can be a web service endpoint, and the application hosting the policy subject can be a Service-Oriented Architecture (SOA) application.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for resolving conflicts between web service policies that are attached (via LPA and/or GPA metadata) to a policy subject (e.g., a WS client/service endpoint). In one set of embodiments, a determination can be made whether two conflicting policies that are attached to the same policy subject are identical. This determination can be based on, e.g., the Uniform Resource Identifiers (URIs) that is used to identify the policies in their respective policy attachment metadata files, as well as any policy configuration properties. If the two conflicting policies are determined to be identical, the policy attachment metadata for one of the policies can be considered valid, while the policy attachment metadata for the other, identical policy can be ignored. In this manner, validation errors arising from duplicate policy attachments can be avoided.

In another set of embodiments, a priority value can be assigned to each policy attached to a policy subject via the policy's corresponding policy attachment metadata file. These priority values can be taken into account when determining whether one policy should be given precedence over another, conflicting policy attached to the same policy subject. In certain embodiments, as part of this determination, the priority value of a policy can be given greater weight than the scope at which the policy is attached. For example, assume that policies attached to a policy subject at a lower scope level are typically given precedence over policies attached at a higher scope level. With the techniques described herein, the policy with the highest priority value can be given precedence even if other, conflicting policies are attached at a lower scope level.

System Overview

Figure 1:
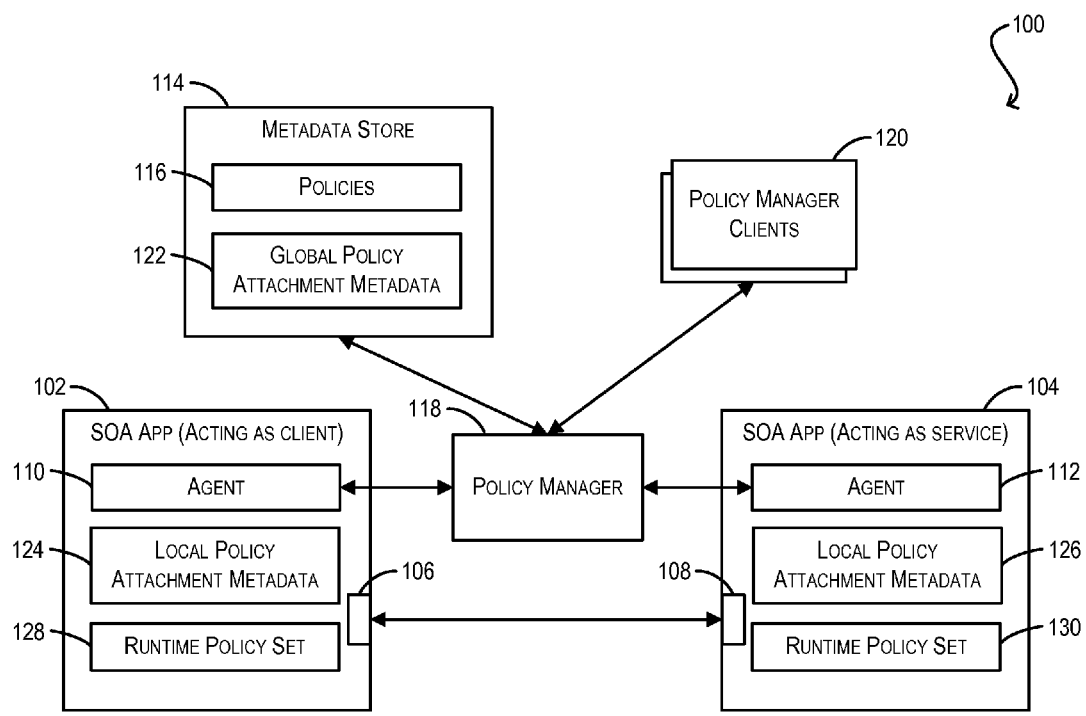
FIG. 1 is a simplified block diagram of a system in accordance with an embodiment of the present invention.

FIG. 1 is a simplified block diagram of a policy-based SOA system 100 according to an embodiment of the present invention. As shown, system 100 can include an SOA application 102 configured to act as a web service client and an SOA application 104 configured to act as a web service. In various embodiments, SOA application 102 can send, via a web service (WS) client endpoint 106 (e.g., a port of application 102), a request message to SOA application 104 to invoke a service operation exposed by application 104. The request message can be expressed using a standard web services communication protocol, such as Simple Object Access Protocol (SOAP). SOA application 104 can receive, via a WS service endpoint 108 (e.g., a port of application 104), the request from SOA application 102 and process the request according to business logic defined for the service operation. SOA application 104 can then generate a response message that is transmitted to, and consumed by, SOA application 102.

As part of this message passing process, SOA applications 102 and 104 can each interoperate with an agent 110, 112. Agents 110 and 112 can be configured to identify, based in part on metadata referred to as policy attachment metadata, one or more declarative policy documents (i.e., web service policies or policies) that are to be attached to endpoints 106 and 108 of SOA applications 102 and 104. Each of these policies can include a set of assertions that define security and/or management-related behaviors to be carried out by an attached endpoint (i.e., policy subject). Agents 110 and 112 can then implement the identified policies at runtime of applications 102 and 104 by, e.g., intercepting messages that are outgoing from WS client endpoint 106 or incoming into WS service endpoint 108, and enforcing the policies attached to the endpoints against the incoming/outgoing messages. By way of example, agent 110 can determine that a username/password authentication policy is attached to WS client endpoint 106, and can therefore enforce the requirement that a username and password be included in all request messages outbound from endpoint 106. If a particular message does not conform to the attached policy, an error can be thrown or some other appropriate action can be taken.

In one set of embodiments, the policies enforced by agents 110 and 112 can be maintained in a central metadata store 114 (as policies 116) and made accessible to agents 110 and 112 via a policy manager component 118. As noted above, each policy 116 can be a declaratively defined document (e.g., an Extensible Markup Language (XML) file) and can include a set of assertions defining security and/or management-related behaviors to be carried out by an attached WS endpoint. Examples of such behaviors include authentication, authorization, message protection/encryption, message logging, and the like. In a particular embodiment, the set of assertions can be expressed using one or more standard World Wide Web Consortium (W3C) specifications, such as WS-Policy, WS-SecurityPolicy, WS-RMPolicy, and/or the like. Alternatively, the set of assertions can be expressed using a proprietary specification or lingo that is translatable into a standard W3C specification. In certain embodiments, new policies can be created or existing policies can be modified/deleted via a user interface that is generated by policy manager 118 and made available to users via one or more policy manager clients 120.

The policy attachment metadata used by agents 110 and 112 to identify which policies are attached to which WS client/service endpoints can generally be of two types: (1) global policy attachment (GPA) metadata (e.g., 122) that is stored with policies 116 in metadata store 114, and (2) local policy attachment (LPA) metadata (e.g., 124 and 126) that is stored locally with a given SOA application. GPA metadata 122 can comprise one or more metadata files (e.g., XML files) that indirectly associate a policy with a set of WS client/service endpoints by specifying a scope (e.g., domain, server, application, application port, etc.) to which the policy should apply. Thus, for example, if a particular GPA metadata file specifies a policy "P1" and a policy subject scope of "server=S1," that indicates that policy P1 should be attached to all of the WS client/service endpoints hosted by applications running on application server S1. The scope levels can be organized in a hierarchy, with "domain" representing the highest scope level and "application port" representing the lowest scope level. In a particular embodiment, the "application port" level can correspond to a specific WS client/service endpoint. This GPA mechanism is typically used by system administrators of an SOA deployment, as it allows them to attach a policy to a multitude of policy subjects in an efficient and consistent manner.

In contrast to GPA metadata 122, LPA metadata 124 and 126 can each comprise one or more metadata files (e.g., XML files) that directly associate a policy with a specific endpoint. For example, LPA metadata 124 can include an LPA metadata file that specifies a policy "P2" and a policy subject "App102Port1" (corresponding to WS client endpoint 106), thereby indicating that policy P2 should be directly attached to endpoint 106. Similarly, LPA metadata 126 can include an LPA metadata file that specifies a policy "P3" and a policy subject "App104Port1" (corresponding to WS service endpoint 108), thereby indicating that policy P3 should be directly attached to endpoint 108. In various embodiments, a local policy attachment can be logically equivalent to a global policy attachment that attaches a policy to the scope level of an "application port." This LPA mechanism is typically used by SOA application developers, as it allows them to define security/management behaviors for the client/service endpoints of their application at design-time, and to subsequently package those behaviors (in the form of LPA metadata files) with the application. In one set of embodiments, LPA metadata such as 124 and 126 can be stored in a location that is local to the WS client/service endpoints that they reference. Accordingly, LPA metadata 124 is depicted in FIG. 1 as being stored locally to SOA application 102, and LPA 126 is depicted in FIG. 1 as being stored locally to SOA application 104.

In certain existing SOA implementations, a runtime policy set component of application 102 or 104 (e.g., 128, 130) can be configured to generate, during an initialization phase of the application, an "effective policy set" for a particular policy subject (e.g., WS client endpoint 106 or WS service endpoint 108). This effective policy set can identify all of the non-conflicting policies that may potentially be enforced or advertised at the policy subject based on the LPA and GPA metadata that has been defined for the subject. The effective policy set can then be stored in runtime policy set component 128, 130 and can be subsequently used by agent 110, 112 to, e.g., advertise or enforce the effective policies at endpoint 106, 108 at runtime.

As part of this effective policy set generation process, agent 110, 112 can execute a a conflict resolution algorithm that automatically excludes from the effective policy set any policies that are deemed to be inapplicable according to one or more rules. This can come into play if, e.g., multiple, conflicting policies are attached to an endpoint at the same or different scope levels (e.g., via different GPA and/or LPA metadata files).

As noted in the Background section, a shortcoming with existing policy-based SOA solutions is that they generally apply an inflexible rule set when performing this conflict resolution algorithm. This inflexibility can be problematic in several scenarios. For example, existing SOA solutions generally impose a strict rule indicating that two policies of the same type (e.g., two authentication policies) cannot be attached to a single WS client/service endpoint at the same time. Thus, if the same authentication policy (e.g., "Auth1") is attached to, e.g., WS client endpoint 106 more that once (via, e.g., different LPA and/or GPA metadata files), an error will be thrown, thereby preventing authentication policy "Auth1" from being enforced at all at endpoint 106. This outcome may not be desirable since, in certain cases, the original intent of the individuals that created the policy attachments may have been to ensure that the policy is attached and enforced at the endpoint.

As another example, existing SOA solutions generally impose a strict rule indicating that a policy attachment defined at a lower scope level always takes precedence over a conflicting policy attachment defined at a higher scope level. However, consider a scenario where (1) application developers have attached, via LPA metadata, various authentication policies to WS client/service endpoints 106 and 108 of SOA applications 102 and 104; and (2) a system administrator of system 100 wishes to define a global policy attachment that attaches a more secure authentication policy at a domain scope of system 100, thereby overriding all of the local policy attachments. With the rule described above this is not possible, since a global policy attachment defined at the scope level of "domain" can never override, or be given precedence over, conflicting local policy attachments (which are considered to be at the lowest scope level of "application port").

Embodiments of the present invention address these limitations (and other similar limitations) by providing (1) techniques for handling the attachment of identical policies (via., e.g., duplicate LPA and/or GPA metadata files) to the same policy subject, and (2) a framework for assigning a priority to each policy—policy subject association defined in an policy attachment metadata file. With respect to (1), a determination can be made (during the effective policy set generation process) whether two conflicting policies that are attached to a single policy subject are identical. This determination can be based on, e.g., the Uniform Resource Identifiers (URIs) that are used to identify the policies in their respective policy attachment metadata files, as well as any policy configuration properties. If the two conflicting policies are determined to be identical, the policy attachment metadata for one of the policies can be considered valid, while the policy attachment metadata for the other, identical policy can be ignored.

With respect to (2), a priority value can be assigned to each policy attached to a policy subject via the policy's corresponding policy attachment metadata file. These priority values can be taken into account when determining whether one policy should be given precedence over another, conflicting policy attached to the same policy subject. In certain embodiments, as part of this determination, the priority value of a policy can be given greater weight than the scope at which the policy is attached. For example, in certain existing implementations, policies attached to a policy subject at a lower scope level are given precedence over policies attached at a higher scope level. With the techniques described herein, the policy with the highest priority value can be given precedence even if other, conflicting policies are attached at a lower scope level.

Additional details regarding the processing that can be performed by the various components of system 100 to facilitate features (1) and (2) are provided in the sections that follow.

It should be appreciated that system 100 of FIG. 1 is illustrative and not intended to limit embodiments of the present invention. For example, the various entities depicted in system 100 can have other capabilities or include other components/sub-components that are not specifically described. One of ordinary skill in the art will recognize many variations, modifications, and alternatives.

Conflict Resolution when Identical Policies are Attached to a Single Policy Subject As noted above, current policy-based SOA solutions do not gracefully handle situations where the same web service policy is attached multiple times (via, e.g., duplicate LPA and/or GPA metadata files) to the same policy subject. For instance, assume a GPA metadata file is defined that attaches an authentication policy "Auth1" to the scope "application port=App102Port1" (which corresponds to endpoint 106 of application 102). Further, assume an LPA metadata file is defined that attaches the same authentication policy "Auth1" directly to port "App102Port1." Generally speaking, only one authentication policy can be attached to endpoint 106 at a time. Accordingly, in this scenario, existing solutions would thrown an error indicating that policy Auth1 cannot be attached to endpoint 106 twice, and neither policy attachment file would take effect (in other words, both policy attachments would be ignored and policy Auth1 would not be enforced at endpoint 106).

Embodiments of the present invention can recognize that this outcome may not be intended, and can instead identify situations where there are duplicate policy attachments in the manner described above. When such a situation is found, one of the policy attachments can be processed, while the other, duplicate policy attachment can be ignored.

Figure 2:
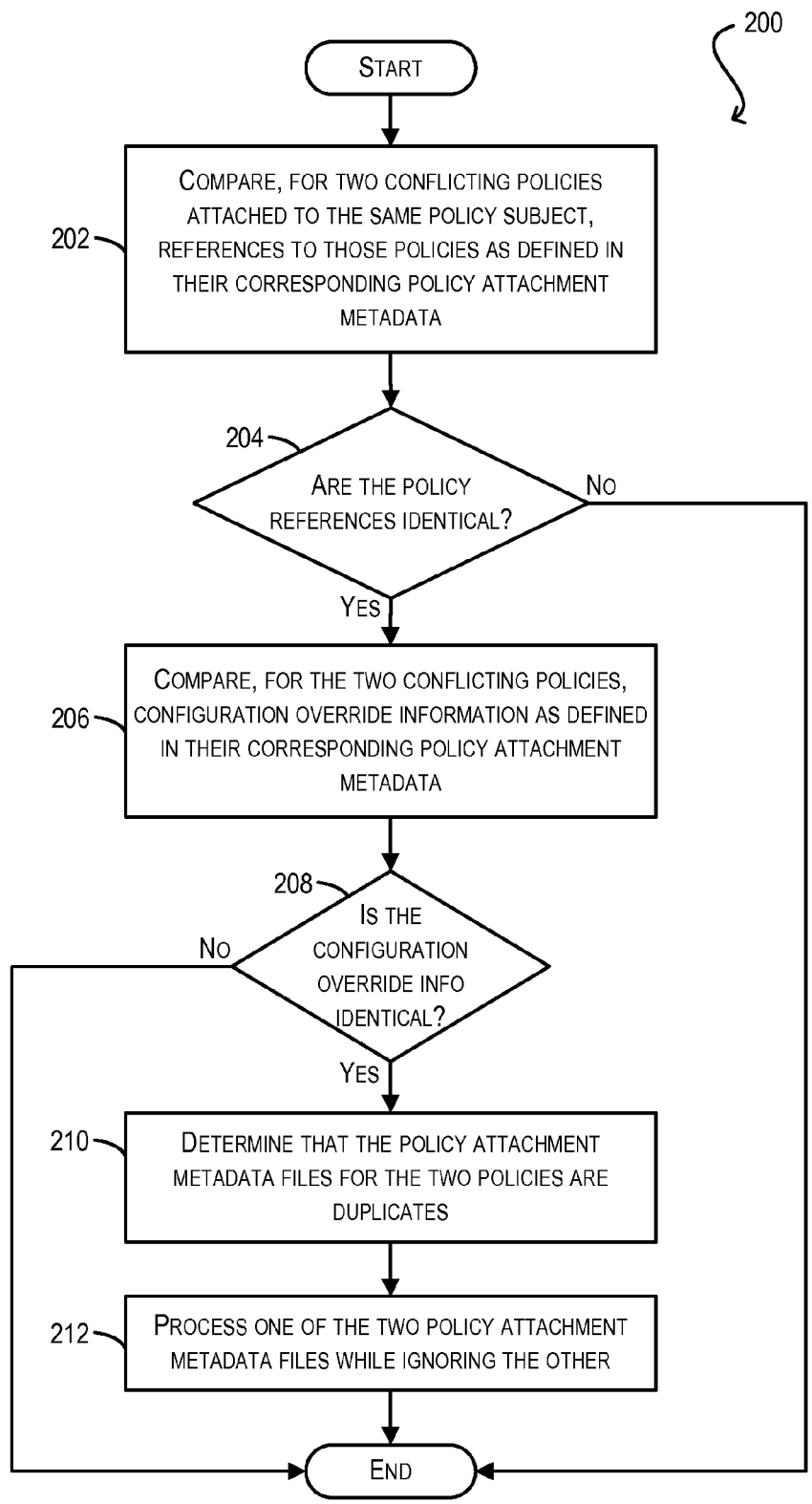
FIG. 2 is a flow diagram of a process for identifying and handling duplicate policy attachments in accordance with an embodiment of the present invention.

FIG. 2 is a flow diagram of a process 200 for identifying and handling duplicate policy attachments according to an embodiment of the present invention. In one set of embodiments, process 200 can be performed by runtime policy set component 128 or 130 of system 100 as part of the conflict resolution algorithm described with respect to FIG. 1. Process 200 can be implemented in hardware, software, or a combination thereof. As software, process 200 can be implemented as program code that is encoded on a non-transitory computer-readable storage medium.

At block 202, runtime policy set component 128, 130 can compare, for two conflicting policies attached to the same policy subject, the references to those policies as defined in their corresponding policy attachment metadata files. In one set of embodiments, such policy references can be expressed in the form an XML "policyReference" element that specifies a URI uniquely identifying a particular policy. Accordingly, in these embodiments, comparing the policy references for the two conflicting policies can include comparing their respective URIs.

If the URIs for the two policies do not match, runtime policy set component 128, 130 can determine that the policies are not identical, and thus process 200 can end (block 204).

However, if the URIs for the two policies do match, runtime policy set component 128, 130 can then compare any configuration override information that is defined for the policies in the policy attachment metadata files (blocks 204, 206). In one set of embodiments, this configuration override information can comprise data that is used by agent 110, 112 enforce the policy at runtime of the specific policy subject referenced in the policy attachment metadata file, such as location for retrieving a username/password (in the case that the policy requires username/password authentication), the location of retrieving an encryption certificate (in the case that the policy requires message protection/encryption), and so on. In a particular embodiment, the configuration override information can be expressed as a series of name/value pairs, such as (name="csfkey," value="mykey"). Thus, comparing the configuration override information for the two policies can include comparing their name/value pairs to determine whether the pairs are identical.

If the configuration override information for the two policies do not match, runtime policy set component 128, 130 can determine that the policies are not identical, and thus process 200 can end (block 208).

However, if both the URIs and the configuration override information for the two policies are determined to be identical, the policy attachment metadata files referencing the policies can be considered duplicates (blocks 208, 210). As a result, runtime policy set component 128, 130 can consider one of the policy attachments to be valid (and thus add the policy to the set of effective policies for the policy subject), while ignoring the other, duplicate attachment (block 212). In this manner, embodiments of the present invention can ensure that the policy is advertised or enforced at the policy subject, regardless of how many times it is inadvertently attached to the policy subject via different LPA and/or GPA metadata files.

It should be appreciated that process 200 is illustrative and not intended to limit embodiments of the present invention. Steps described as sequential can be executed in parallel, order of steps can be varied, and steps can be modified, combined, added, or omitted. One of ordinary skill in the art will recognize many variations, modifications, and alternatives.

Priority Assignments for Policy Attachments

While process 200 of FIG. 2 addresses the specific situation where the same web service policy is attached multiple times to the same policy subject, there are also other scenarios where more flexible conflict resolution handling is desirable. For example, existing policy-based SOA solutions generally enforce a rule that states when two conflicting policies are attached to the same policy subject at different scope levels, the policy attachment that is defined at a lower scope level in the scope hierarchy of (domain, server, application, application port) will take precedence over the other. However, this means that local policy attachments (which are, by definition, always defined at the application port level) will always take precedence over, or override, a conflicting global policy attachment that is attached at a higher scope level (e.g., domain). This can cause issues in situations where, e.g., a system administrator wishes to override a large number of local policy attachments in an SOA deployment with a global policy attachment that applies to all client/service endpoints within a higher scope level.

To address this, in certain embodiments a priority value can be assigned to each local or global policy attachment. The priority value can be used to determine whether one policy attachment will take precedence over another, conflict policy attachment, regardless of the scope of the two attachments. Accordingly, this mechanism provides a way to supersede the default rule that indicates a lower-scoped policy attachment always takes precedence over a higher-scoped policy attachment.

Figure 3:
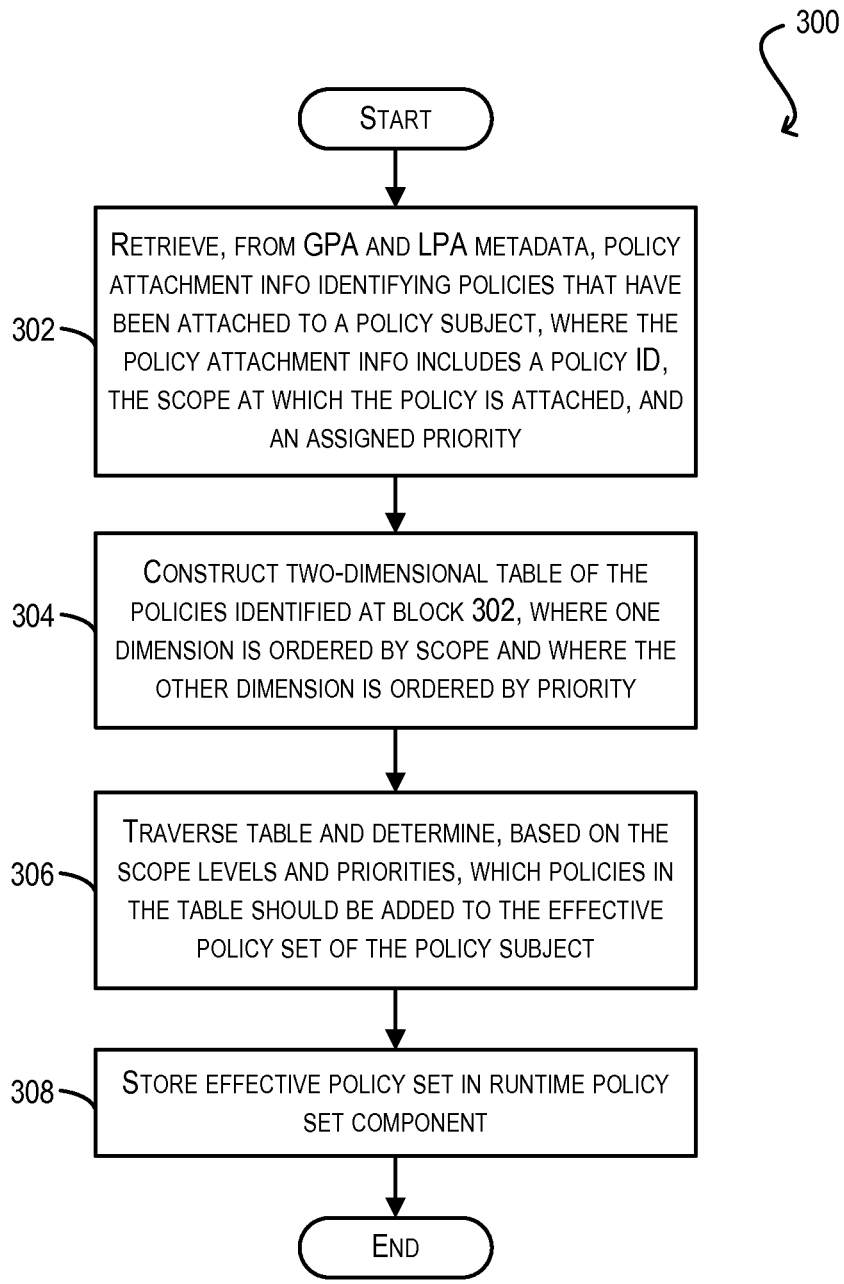
FIG. 3 is a flow diagram of a process for using priority values to resolve policy attachment conflicts in accordance with an embodiment of the present invention.

FIG. 3 is a flow diagram of a process 300 for using priority values to resolve policy attachment conflicts in accordance with an embodiment of the present invention. In one set of embodiments, process 300 can be performed by runtime policy set component 128 or 130 of system 100 as part of the conflict resolution algorithm described with respect to FIG. 1. Process 300 can be implemented in hardware, software, or a combination thereof. As software, process 300 can be implemented as program code that is encoded on a non-transitory computer-readable storage medium.

At block 302, runtime policy set component 128, 130 can retrieve, from GPA metadata 122 and LPA metadata 124, 126, policy attachment information identifying web service policies that have been attached to a particular policy subject (e.g., endpoint 106 or 108). This policy attachment information can include, e.g., a unique identifier of each policy, the scope at which the policy is attached, and an assigned priority for the policy. In certain embodiments, the assigned priority can be expressed as a configuration override property in each policy attachment metadata file, with a name of "referencePriority" and a value indicating the priority value (e.g., an integer). If no priority is assigned to a policy in its corresponding policy attachment metadata file, the priority for that policy can be defaulted to zero.

At block 304, runtime policy set component 128, 130 can construct a two-dimensional table of the policies identified at block 302, where a first dimension of the table is organized by scope, and where the second dimension of the table is organized by priority. For example, the row headers of the table can correspond to the various scope levels in the scope hierarchy, ordered from lowest to highest (e.g., application port, application, server, domain), while the column headers of the table can correspond to various priority values, ordered from highest to lowest (e.g., 3, 2, 1, 0, etc.). The data in each cell of the table can include the identifier of a policy that is attached at the cell's scope level and is assigned the cell's priority value.

At block 306, runtime policy set component 128, 130 can traverse the table constructed at block 304 and can determine, based on the scope levels and priorities associated with the policies in the table, which policies should be added to the effective set of policies for endpoint 106, 108. In various embodiments, this processing can determine if there is a conflict between two policies (e.g., the two policies are of the same policy category), and if such a conflict exists, can automatically give precedence to the policy that has the highest priority value, regardless of the scope at which the two policies are attached. The policy that takes precedence can be added to the effective policy set, which the other, conflicting policy is ignored.

By way of example, the following pseudo-code illustrates a particular implementation of the processing at block 306. Note that this pseudo-code assumes an index C1 has been created that will hold all of the categories provided by the policies in the effective policy set. C1 can be initialized to an empty index.

```
loop through each priority P1 in the table (T) in descending order
    loop through each scope S1 in P1 in ascending order
        create index of all policy categories for the policies in the
    current prioritized scope (C2)
        loop through each policy P1 in S1
            get policy categories provided by P1
            if C3 does not intersect with C1
                add P1 to the effective policy set (EPS)
                add C3 to C2
        add C2 to C1
return EPS
```

Once the effective policy set for endpoint 106, 108 has been generated, that information can be stored in runtime policy set component 128, 130 (block 308). Component 128, 130 can then be used by agent 110, 112 at runtime of application 102, 104 to advertise or enforce policies in the effective set at the endpoint.

It should be appreciated that process 300 is illustrative and not intended to limit embodiments of the present invention. Steps described as sequential can be executed in parallel, order of steps can be varied, and steps can be modified, combined, added, or omitted. One of ordinary skill in the art will recognize many variations, modifications, and alternatives.

Computer System Embodiments

Figure 4:
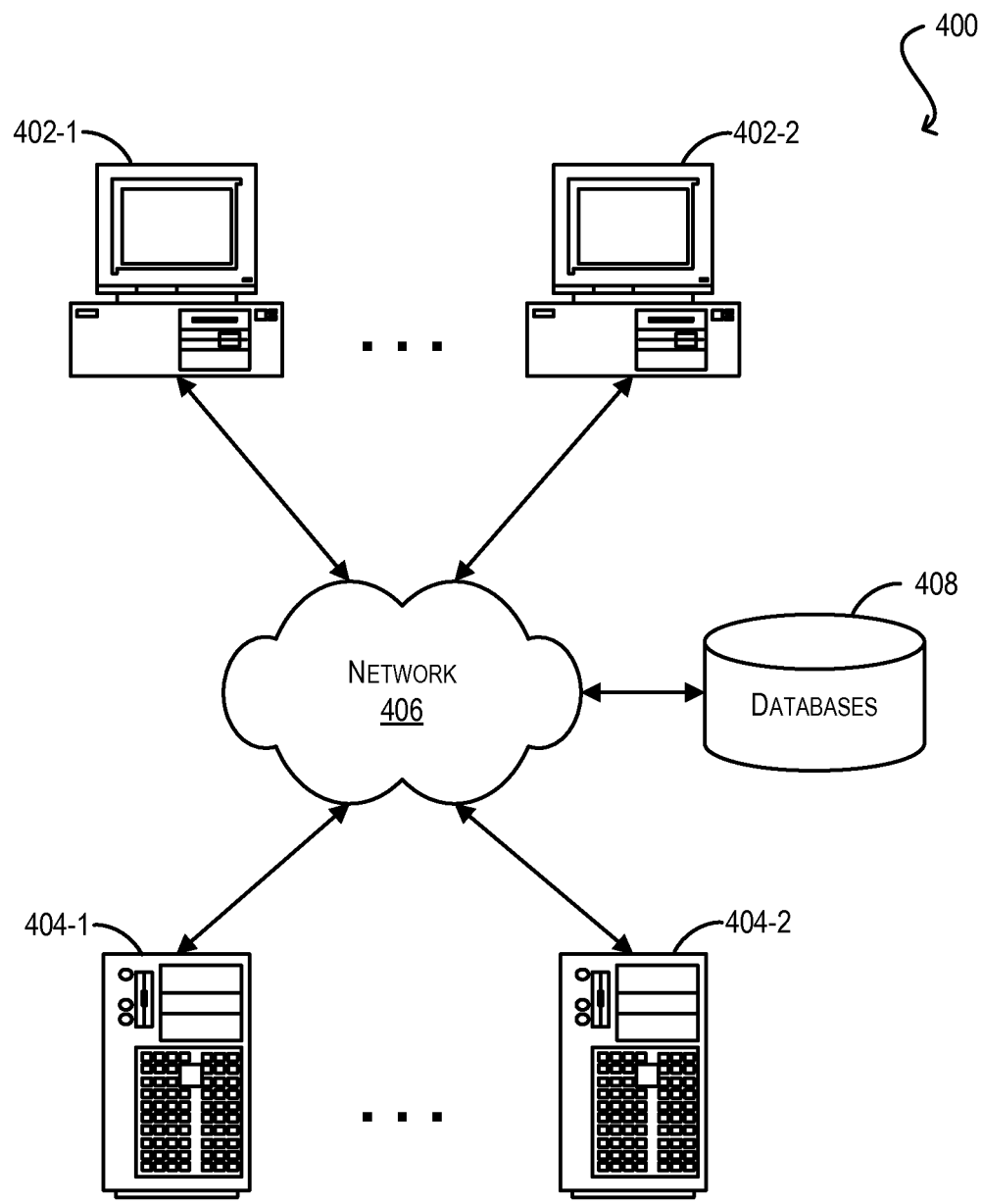
FIG. 4 is a simplified block diagram of a system environment in accordance with an embodiment of the present invention.

FIG. 4 is a simplified block diagram of a system environment 400 that can be used in accordance with an embodiment of the present invention. As shown, system environment 400 can include one or more client computing devices 402-1 and 402-2, which can be configured to operate a client application such as a web browser, a UNIX/Solaris terminal application, and/or the like. In various embodiments, client computing devices 402-1, 402-2 can correspond to policy manager clients 120 of FIG. 1, and can be operated by one or more users to interact with policy manager 118.

Client computing devices 402-1, 402-2 can be general purpose personal computers (e.g., personal computers and/or laptop computers running various versions of Microsoft Windows and/or Apple Mac OSX operating systems), cell phones or PDAs (running software such as Apple iOS, Google Android, or the like and being Internet, e-mail, SMS, or other communication protocol enabled), and/or workstation computers running any of a variety of commercially-available UNIX or UNIX-like operating systems (including without limitation the variety of GNU/Linux operating systems). Alternatively, client computing devices 402-1, 402-2 can be any other electronic device capable of communicating over a network, such as network 406 described below. Although system environment 400 is shown with two client computing devices, it should be appreciated that any number of client computing devices can be supported.

System environment 400 can further include a network 406. Network 406 can be any type of network familiar to those skilled in the art that can support data communications using a network protocol, such as TCP/IP, SNA, IPX, AppleTalk, and the like. Merely by way of example, network 406 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 400 can further include one or more server computers 404-1 and 404-2, which can be general purpose computers, specialized server computers (including, e.g., PC servers, UNIX servers, mid-range servers, mainframe computers, rack-mounted servers, etc.), server farms, server clusters, or any other appropriate arrangement and/or combination. Servers 404-1, 404-2 can run an operating system including any of those discussed above, as well as any commercially available server operating system. Servers 404-1, 404-2 can also run any of a variety of server applications and/or mid-tier applications, including web servers, FTP servers, CGI servers, Java virtual machines, and the like. In one set of embodiments, servers 404-1, 404-2 can each run an application server that is configured to provide an execution environment for SOA application 102, SOA application 104, and/or policy manager 118 of FIG. 1.

System environment 400 can further include one or more databases 408. In one set of embodiments, databases 408 can include databases that are managed by one or more of servers 404-1, 404-2. In a particular embodiment, databases 408 can be configured to store information maintained in metadata store 114 of FIG. 1. Databases 408 can reside in a variety of locations. By way of example, databases 408 can reside on a storage medium local to (and/or resident in) one or more of computers 402-1, 402-2, 404-1, 404-2. Alternatively, databases 408 can be remote from any or all of computers 402-1, 402-2, 404-1, 404-2, and/or in communication (e.g., via network 406) with one or more of these. In one set of embodiments, databases 408 can reside in a storage-area network (SAN) familiar to those skilled in the art.

Figure 5:
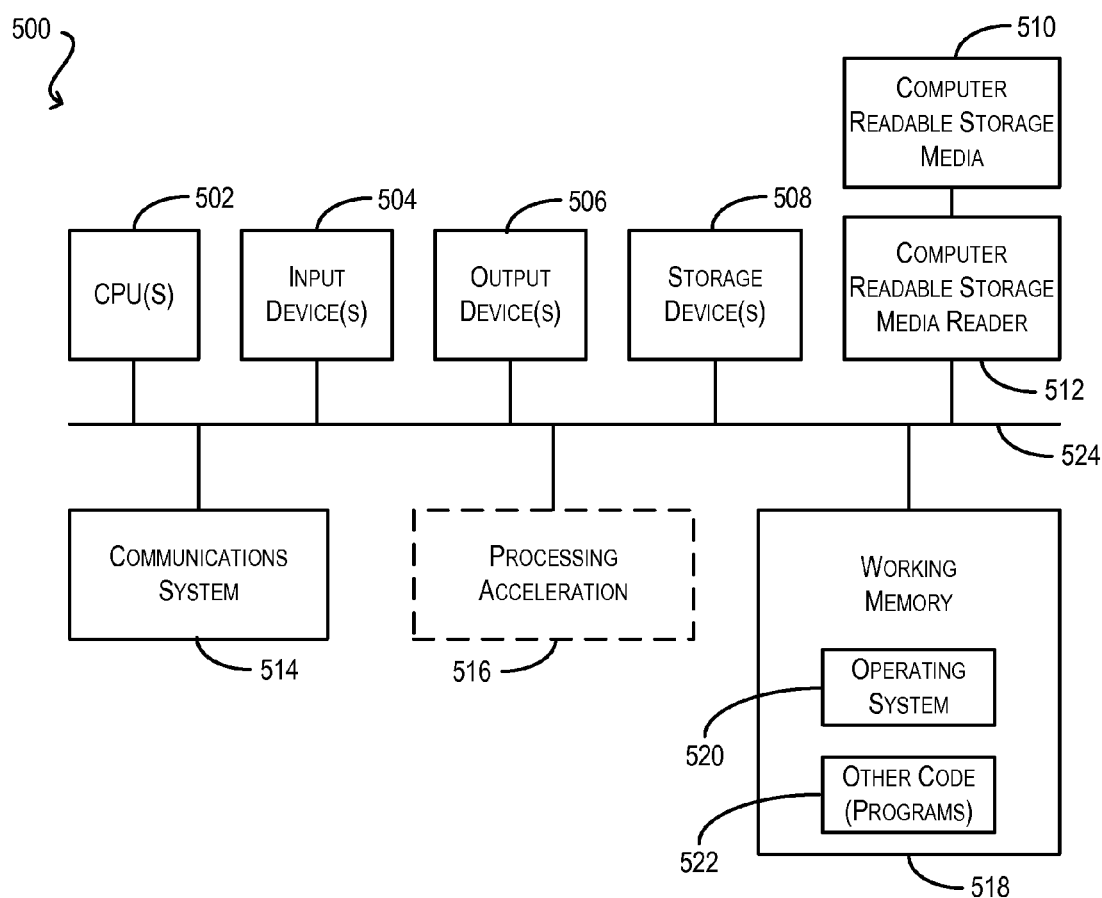
FIG. 5 is a simplified block diagram of a computer system in accordance with an embodiment of the present invention.

FIG. 5 is a simplified block diagram illustrating a computer system 500 that can be used in accordance with an embodiment of the present invention. In various embodiments, computer system 500 can be used to implement any of computers 402-1, 402-2, 404-1, 404-2 described with respect to system environment 400 above. As shown, computer system 500 can include hardware elements that are electrically coupled via a bus 524. The hardware elements can include one or more central processing units (CPUs) 502, one or more input devices 504 (e.g., a mouse, a keyboard, etc.), and one or more output devices 506 (e.g., a display device, a printer, etc.). Computer system 500 can also include one or more storage devices 508. By way of example, the storage device(s) 508 can include devices such as disk drives, optical storage devices, and solid-state storage devices such as a random access memory (RAM) and/or a read-only memory (ROM), which can be programmable, flash-updateable and/or the like.

Computer system 500 can additionally include a computer-readable storage media reader 512, a communications subsystem 514 (e.g., a modem, a network card (wireless or wired), an infra-red communication device, etc.), and working memory 518, which can include RAM and ROM devices as described above. In some embodiments, computer system 500 can also include a processing acceleration unit 516, which can include a digital signal processor (DSP), a special-purpose processor, and/or the like.

Computer-readable storage media reader 512 can be connected to a computer-readable storage medium 510, together (and, optionally, in combination with storage device(s) 508) comprehensively representing remote, local, fixed, and/or removable storage devices plus storage media for temporarily and/or more permanently containing computer-readable information. Communications system 514 can permit data to be exchanged with network 406 and/or any other computer described above with respect to system environment 400.

Computer system 500 can also comprise software elements, shown as being currently located within working memory 518, including an operating system 520 and/or other code 522, such as an application program (which may be a client application, Web browser, middle tier/server application, etc.). It should be appreciated that alternative embodiments of computer system 500 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 500 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, and any other non-transitory medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain process flows and steps, it should be apparent to those skilled in the art that the scope of the present invention is not limited to the described flows/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method for controlling execution behavior of policy subjects, the method comprising:

retrieving, by a computer system, policy attachment information identifying a plurality of web service policies whose policy attachment metadata indicate attachment at runtime to a policy subject, wherein the policy attachment information comprises, for each web service policy in the plurality of web service polices, an identifier of the web service policy, a scope at which the web service policy is attached to the policy subject at runtime, and a priority value;

determining, by the computer system, an ordering of each web service policy in the plurality of web service policies based on the priority value of the web service policy and the scope at which the web service policy is attached to the policy subject;

determining, by the computer system, that a first web service policy in the plurality of web service policies is given precedence over a second web service policy in the plurality of web service policies based on the determined ordering, wherein attachment of the first web service policy and the second web service policy at the policy subject conflict;

adding, by the computer system, the first web service policy to an effective policy set of the policy subject, the effective policy set comprising policies enforced at the policy subject at runtime; and performing one or more actions that control execution behavior of the policy subject based the effective policy set.

2. The method of claim 1 wherein the policy attachment information is retrieved from one or more policy attachment metadata files associated with the policy subject.

3. The method of claim 2 wherein the one or more policy attachment metadata files include a local policy attachment (LPA) metadata file and a global policy attachment (GPA) metadata file.

4. The method of claim 1:
wherein determining the ordering of each of the plurality of web service policies comprises determining a first dimension of organized by scope and a second dimension organized by priority value, and wherein each intersection between the first and second dimensions identifies a web service policy in the plurality of web service policies; and
wherein determining that the first web service policy is given precedence over the second web service policy comprises traversing the ordering along the first dimension representing scope and the second dimension representing priority.

5. The method of claim 1 wherein the first web service policy has a higher priority value than the second web service policy, and wherein the first web service policy is attached at a higher scope level than the second web service policy.

6. The method of claim 1 wherein the first web service policy has the same priority value as the second web service policy, and wherein the first web service policy is attached at a lower scope level than the second web service policy.

7. The method of claim 1 wherein the first and second web service policies conflict due to having identical policy types.

8. The method of claim 7 wherein the first and second web service policies are both authentication policies.

9. The method of claim 1 wherein the second web service policy is not added to the effective policy set.

10. The method of claim 1 wherein the policy subject is a web service endpoint, and wherein the application hosting the policy subject is a Service-Oriented Architecture (SOA) application.

11. The method of claim 1 wherein determining, by the computer system, that the first web service policy is given precedence over the second web service policy comprises traversing the ordering along a first dimension representing priority and a second dimension representing scope.

12. A non-transitory computer-readable medium having stored thereon program code executable by a computer system, the program code comprising:
   code that causes the computer system to retrieve policy attachment information identifying a plurality of web service policies whose policy attachment metadata indicate attachment at runtime to a policy subject, wherein the policy attachment information comprises, for each web service policy in the plurality of web service polices, an identifier of the web service policy, a scope at which the web service policy is attached to the policy subject at runtime, and a priority value;
   code that causes the computer system to determine an ordering of each web service policy in the plurality of web service policies based on the priority value of the web service policy and the scope at which the web service policy is attached to the policy subject;
   code that causes the computer system to that a first web service policy in the plurality of web service policies is given precedence over a second web service policy in the plurality of web service policies based on the determined ordering, wherein attachment of the first web service policy and the second web service policy at the policy subject conflict;
   code that causes the computer system to add the first web service policy to an effective policy set of the policy subject, the effective policy set comprising policies enforced at the policy subject at runtime; and
   code that causes the computer system to perform one or more actions that control execution behavior of the policy subject based the effective policy set.

13. The non-transitory computer-readable medium of claim 12:
   wherein the code that causes the computer system to determine the ordering of each of the plurality of web service policies comprises code that causes the computer system to determine a first dimension of organized by scope and a second dimension organized by priority value, and wherein each intersection between the first and second dimensions identifies a web service policy in the plurality of web service policies; and
   wherein the code that causes the computer system to determine that the first web service policy is given precedence over the second web service policy comprises code that causes the computer system to traverse the ordering along the first dimension representing scope and the second dimension representing priority.

14. The non-transitory computer-readable medium of claim 12 wherein the first web service policy has a higher priority value than the second web service policy, and wherein the first web service policy is attached at a higher scope level than the second web service policy.

15. The non-transitory computer-readable medium of claim 12 wherein the first web service policy has the same priority value as the second web service policy, and wherein the first web service policy is attached at a lower scope level than the second web service policy.

16. The non-transitory computer-readable medium of claim 12 wherein the code that causes the processor to determine that the first web service policy is given precedence over the second web service policy comprises code that causes the processor to traverse the ordering along a first dimension representing priority and a second dimension representing scope.

17. A system comprising:
   a hardware processor configured to:
   retrieve policy attachment information identifying a plurality of web service policies whose policy attachment metadata indicate attachment at runtime to a policy subject, wherein the policy attachment information comprises, for each web service policy in the plurality of web service polices, an identifier of the web service policy, a scope at which the web service policy is attached to the policy subject at runtime, and a priority value;
   determine an ordering of each web service policy in the plurality of web service policies based on the priority value of the web service policy and the scope at which the web service policy is attached to the policy subject;
   determine that a first web service policy in the plurality of web service policies is given precedence over a second web service policy in the plurality of web service policies based on the determined ordering, wherein attachment of the first web service policy and the second web service policy at the policy subject conflict;
   add the first web service policy to an effective policy set of the policy subject, the effective policy set comprising policies enforced at the policy subject at runtime; and
   perform one or more actions that control execution behavior of the policy subject based the effective policy set.

18. The system of claim 17:
   wherein to determine the ordering of each of the plurality of web service policies the processor is configured to determine a first dimension of organized by scope and a second dimension organized by priority value, and wherein each intersection between the first and second dimensions identifies a web service policy in the plurality of web service policies; and
   wherein to determine that the first web service policy is given precedence over the second web service policy the processor is configured to traverse the ordering along the first dimension representing scope and the second dimension representing priority.

19. The system of claim 17 wherein the first web service policy has a higher priority value than the second web service policy, and wherein the first web service policy is attached at a higher scope level than the second web service policy.

20. The system of claim 17 wherein the first web service policy has the same priority value as the second web service policy, and wherein the first web service policy is attached at a lower scope level than the second web service policy.

* * * * *

UNITED STATES PATENT AND TRADEMARK OFFICE
CERTIFICATE OF CORRECTION

| | | |
|---|---|---|
| PATENT NO. | : 9,088,571 B2 | Page 1 of 1 |
| APPLICATION NO. | : 13/596525 | |
| DATED | : July 21, 2015 | |
| INVENTOR(S) | : Bryan et al. | |

It is certified that error appears in the above-identified patent and that said Letters Patent is hereby corrected as shown below:

On The Title Page,

On page 3, in column 1, Item (56) References Cited under other publications, line 11, delete "Oct." and insert -- (Oct. --, therefor.

In The Specification,

In column 7, line 33, before "conflict" delete "a a" and insert -- a --, therefor.

In column 7, line 49, after "more" delete "that" and insert -- than --, therefor.

In column 8, line 63, delete "thrown" and insert -- throw --, therefor.

Signed and Sealed this
First Day of March, 2016

Michelle K. Lee
*Director of the United States Patent and Trademark Office*